United States Patent
Oshita (10) Patent No.: US 9,377,911 B2
(45) Date of Patent: Jun. 28, 2016

(54) INPUT DEVICE

(71) Applicant: ALPS ELECTRIC CO., LTD., Ota-ku, Tokyo (JP)

(72) Inventor: Kazuhito Oshita, Tokyo (JP)

(73) Assignee: ALPS ELECTRIC CO., LTD, Tokyo (JP)

( * ) Notice: Subject to any disclaimer, the term of this patent is extended or adjusted under 35 U.S.C. 154(b) by 0 days.

(21) Appl. No.: 14/095,360

(22) Filed: Dec. 3, 2013

(65) Prior Publication Data

US 2014/0267149 A1      Sep. 18, 2014

(30) Foreign Application Priority Data

Mar. 18, 2013  (JP) ................................. 2013-055280

(51) Int. Cl.
*G06F 3/041*      (2006.01)
*G06F 3/044*      (2006.01)

(52) U.S. Cl.
CPC .............. *G06F 3/044* (2013.01); *G06F 3/0416* (2013.01); *G06F 2203/04104* (2013.01)

(58) Field of Classification Search
CPC ........ G06F 3/041; G06F 3/0414; G06F 3/044
See application file for complete search history.

(56) References Cited

U.S. PATENT DOCUMENTS

| | | | |
|---|---|---|---|
| 8,446,374 B2 * | 5/2013 | Westerman ......... | G06F 3/03543 345/163 |
| 8,466,888 B2 * | 6/2013 | Lin et al. ........................ | 345/173 |
| 2007/0262968 A1 | 11/2007 | Oshita et al. | |
| 2008/0165160 A1 * | 7/2008 | Kocienda et al. ............. | 345/175 |
| 2011/0291944 A1 * | 12/2011 | Simmons et al. ............. | 345/173 |
| 2012/0023459 A1 * | 1/2012 | Westerman ................... | 715/863 |
| 2012/0113007 A1 * | 5/2012 | Koch et al. .................... | 345/168 |

FOREIGN PATENT DOCUMENTS

JP      2007-304757      11/2007

* cited by examiner

*Primary Examiner* — Alexander Eisen
*Assistant Examiner* — Kebede Teshome
(74) *Attorney, Agent, or Firm* — Hunton & Williams LLP (57) ABSTRACT

An operation surface includes a pressing operation area and a sliding operation area. When a single operation body is detected in the pressing operation area by an operation position detection unit, an operation process is not performed if a first sliding movement amount of the operation body is equal to or less than a first threshold, and the operation process is performed if the first sliding movement amount is greater than the first threshold. When there is a plurality of operation bodies and at least one of them is detected in the pressing operation area, the operation process is not performed if a second sliding movement amount of the operation body is equal to or less than a second threshold, and the operation process is performed if the second sliding movement amount is greater than the second threshold. At this time, the second threshold is greater than the first threshold.

2 Claims, 9 Drawing Sheets

INPUT DEVICE

CLAIM OF PRIORITY

This application claims contains subject matter related to and claims the benefit of Japanese Patent Application No. 2013-055280 filed on Mar. 18, 2013, the entire contents of which is incorporated herein by reference.

BACKGROUND OF THE DISCLOSURE

1. Field of the Disclosure

Embodiments of the present disclosure relate to an input device which includes an operation surface, an operation position detection unit, such as a capacitive sensor, and a pressing detection unit, such as a mechanical switch, and, in particular, to an input device in which input sensitivity for a planar direction is adjusted in an area which is a part of the operation surface and in which a pressing operation is frequently performed.

2. Description of the Related Art

An input device disclosed in Japanese Unexamined Patent Application Publication No. 2007-304757 includes an input pad which is provided in front of a keyboard input device. When the operation surface of the surface of the input pad is operated using a finger, it is possible to detect the operation position thereof using, for example, a capacitive sensor which is set in the input pad. In addition, it is possible to vertically move the input pad, and a pressing detection switch is provided at the lower part of the input pad. Therefore, when the input pad is pressed downward, the pressing detection switch is turned on, and thus it is possible to detect a pressing operation.

In the input device, if a finger touches the operation surface and operates in the planar direction, a finger operation position signal is output by the capacitive sensor, and a control unit outputs a sliding operation input signal based on the operation position signal. An electronic apparatus equipped with an input device performs, for example, an operation process of moving a cursor on a display screen based on the sliding operation input signal.

The whole area of the operation surface can be used as an operation position detection area using a capacitive sensor, and the whole area of the operation surface is set as an area on which the pressing operation can be performed. Further, if the operation surface is pressed downward by the finger, the pressing detection switch is switched into an ON state. If the pressing detection switch is turned on, the control unit outputs a pressing operation input signal. The pressing operation input signal is generated which is the same as an input signal acquired when an L button or an R button, which is provided in parallel in a mouse or an input pad according to the related art, is pressed.

Figure 11:
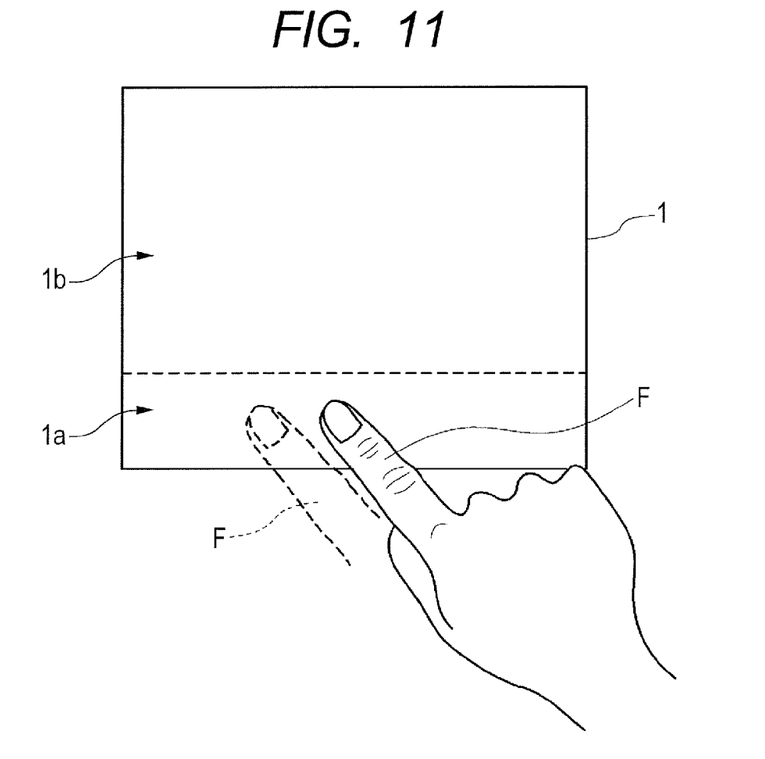
FIG. 11 is a plan view illustrating a problem which occurs when a pressing operation is performed on a pressing operation area by a finger in an input device according to the related art.

As shown in FIG. 11, an operation surface 1 is divided into a pressing operation area 1a on which a pressing operation is frequently performed and an area 1b on which a sliding operation is frequently performed. As shown in FIG. 11, if the pressing operation area 1a is pressed downward by a finger F, a pressing detection switch is turned on, and thus a pressing operation input signal is output.

However, if the finger F unintentionally performs sliding movement while pressing the area as shown using a dotted line in FIG. 11, the sliding movement of the finger F is detected by a capacitive sensor, and thus the control unit outputs a sliding operation input signal. As a result, there is a case in which an incorrect operation, such as an unintended cursor movement on a display screen, is generated. In addition, even when the finger F does not move, the contact area of the finger F and the operation surface 1 becomes large due to a pressing operation, and thus there is a case in which the capacitive sensor outputs erroneous detection results for the variation in the contact area as if the finger performs sliding movement, and the control unit outputs a sliding operation input signal.

Figure 12:
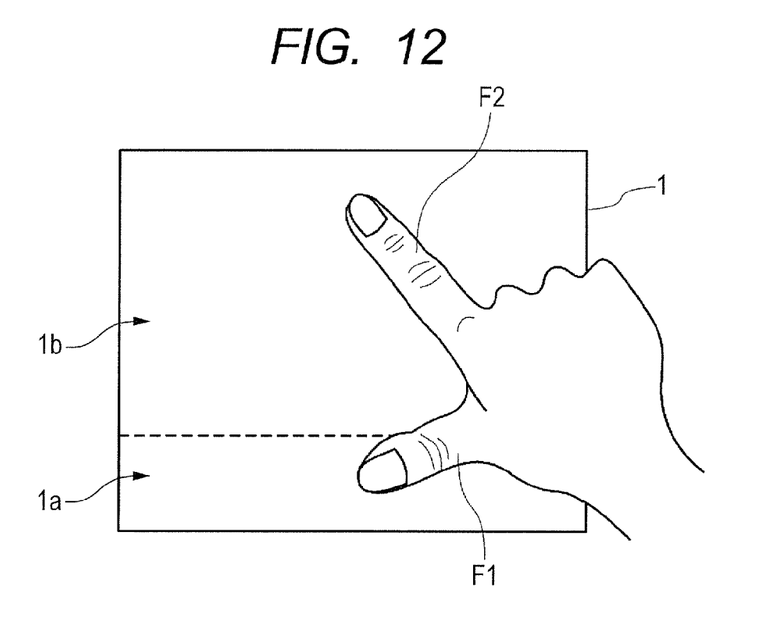
FIG. 12 is a plan view illustrating a problem which occurs when two fingers touch the operation surface and a single finger of them is present on the pressing operation area and a remaining single finger is present on the sliding operation area in the input device according to the related art.

In addition, as shown in FIG. 12, there is a case in which an operation is performed by placing a plurality of fingers F1 and F2 on the operation surface 1. In FIG. 12, the first finger (thumb) F1 is present on the pressing operation area 1a and the second finger (index finger) F2 is present on the sliding operation area 1b. In FIG. 12, a pointer movement operation is performed in which the first finger F1 is placed on the pressing operation area 1a and the second finger F2 is caused to perform the sliding movement on the sliding operation area 1b.

However, there is a case in which the first finger F1 unintentionally performs the sliding movement together with the sliding movement of the second finger F2. At this time, the sliding movement of the first finger F1 is detected by the capacitive sensor, and thus the control unit outputs a sliding operation input signal for the first finger F1. As a result, there is a case in which an incorrect operation, such as the display of a pointer movement which is different from an intended pointer movement or an unexpected gesture on the display screen, is generated.

In particular, when an operation is performed using the plurality of fingers F1 and F2 as shown in FIG. 12, it is easy for the amount of unintended sliding movement of the first finger F1, which is positioned in the pressing operation area 1a, to be large, compared to a case in which an operation is performed using a single finger F as shown in FIG. 11.

These and other drawbacks exist.

SUMMARY OF THE DISCLOSURE

The present disclosure provides an input device which can suppress an incorrect operation in an area on which a pressing operation is frequently performed.

An input device according to an example embodiment includes: an operation surface; an operation position detection unit that detects an operation position of an operation body on the operation surface; a pressing detection unit that detects pressing of the operation surface; and a control unit that receives an operation position detection signal from the operation position detection unit and a pressing detection signal from the pressing detection unit, respectively. The operation surface includes a pressing operation area and a sliding operation area. When there is a single operation body which operates on the operation surface and the operation body is detected in the pressing operation area by the operation position detection unit, the control unit does not output a sliding operation input signal based on a first sliding movement amount if the first sliding movement amount based on the operation position detection signal of the operation body is equal to or less than a first threshold, and outputs the sliding operation input signal based on the first sliding movement amount if the first sliding movement amount is greater than the first threshold. When there is a plurality of operation bodies which operate on the operation surface and at least one of the operation bodies is detected in the pressing operation area by the operation position detection unit, the control unit does not output a sliding operation input signal based on a second sliding movement amount if the second sliding movement amount, based on the operation position detection signal of the operation body which is detected in the pressing operation area, is equal to or less than a second threshold, and outputs the sliding operation input signal based on the second sliding movement amount if the second sliding movement amount is greater than the second threshold. The second threshold is greater than the first threshold.

In the embodiments of the present disclosure, a threshold is set. When the sliding movement amount of the operation body in the pressing operation area is equal to or less than the threshold, the sliding operation input signal based on the sliding movement amount is not output. When the sliding movement amount is greater than the threshold, the sliding operation input signal based on the sliding movement amount is output. That is, according to the present disclosure, the input sensitivity in the sliding direction is caused to be insensitive (to be low) in the pressing operation area compared to the related art. Therefore, for example, even when the operation body performs a slight sliding movement in a step in which the pressing operation is performed by the operation body in the pressing operation area, it is possible to suppress an incorrect operation compared to the related art by ignoring the sliding movement if the sliding movement amount is less than the threshold at that time.

In addition, when there is a plurality of operation bodies which operate the operation surface, it is easy for the unintended sliding movement amount of the operation body which operates the pressing operation area to be large compared to the case in which there is the single operation body. Therefore, the second threshold which is set when the plurality of operation bodies is detected is greater than the first threshold which is set when the single operation body is detected. Therefore, regardless of the number of operation bodies, it is possible to effectively suppress an incorrect operation in the pressing operation area.

In addition, in the embodiments of the present disclosure, when there is the plurality of operation bodies which operate the operation surface and a distance between a first operation body which is detected in the pressing operation area and an operation body other than the first operation body is greater than a predetermined value, the second threshold is set such that the second threshold is greater than the first threshold. As described above, when there is the plurality of operation bodies and the distance between the first operation body and the other operation body is equal to or greater than a predetermined value, the second threshold is set to a value which is greater than the first threshold. Therefore, when each of the operation bodies is not so far from each other (when being equal to or less than the predetermined value), it is possible to set the second threshold to a value which is the same as the first threshold. Even when the plurality of operation bodies is detected as described above, it is possible to change the threshold depending on the distance between the first operation body which is detected in the pressing operation area and an operation body other than the first operation body. Therefore, it is possible to effectively improve operability in the pressing operation area and suppression of incorrect operation.

DETAILED DESCRIPTION OF THE DISCLOSURE

The following description is intended to convey a thorough understanding of the embodiments described by providing a number of specific embodiments and details involving an input device. It should be appreciated, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending on specific design and other needs.

Figure 1:
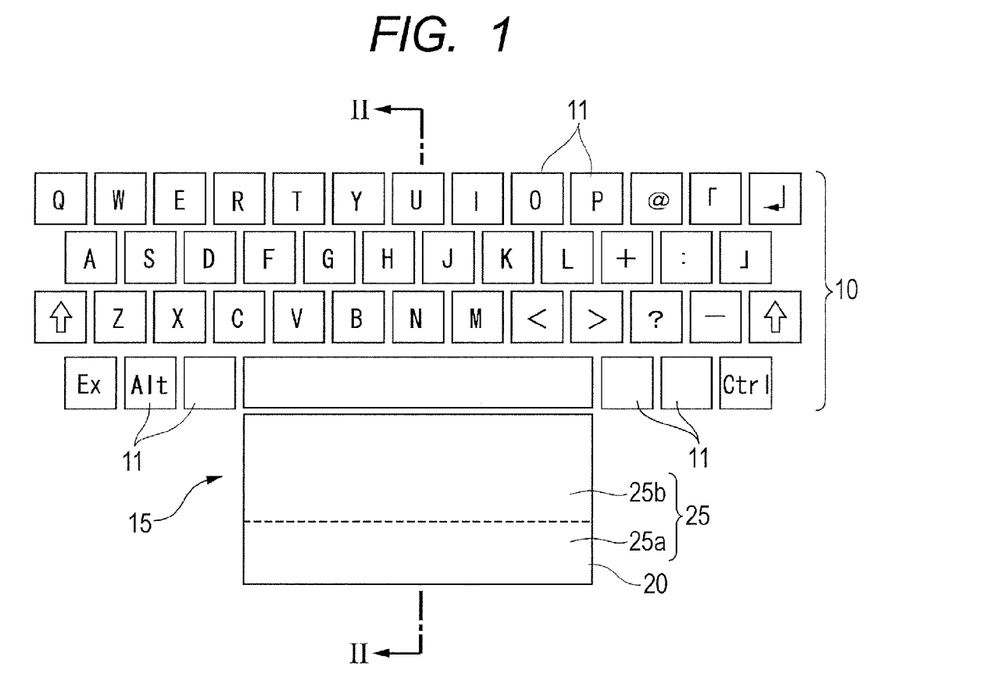
FIG. 1 is a plan view illustrating an input device according to an embodiment of the present disclosure together with a keyboard input device.
Figure 2:
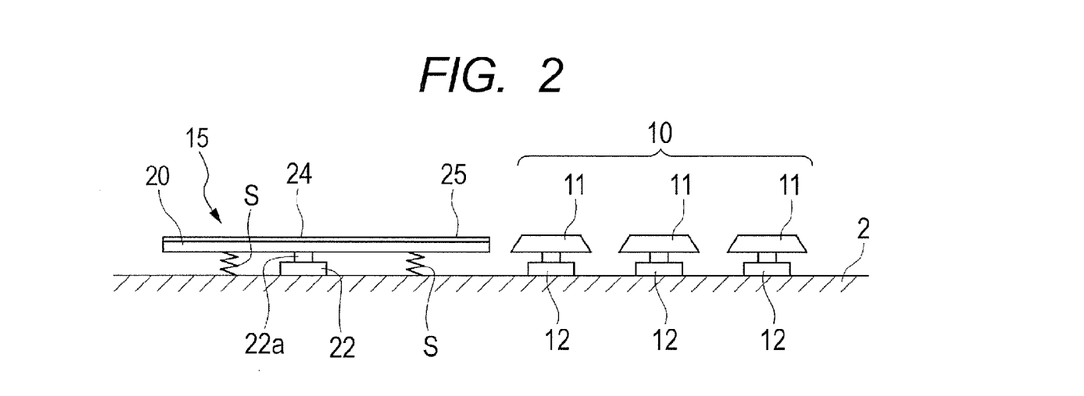
FIG. 2 is a cross-sectional view taken along a line II-II in FIG. 1.

An input device 15 shown in FIGS. 1 and 2 may be equipped in various information input devices, such as a control board of a personal computer, an operation device of a game apparatus or a television, and the like. In an example embodiment below, description will be made by assuming that the input device (e.g., touch pad) 15 is equipped in the control board of a personal computer.

In addition to the input device 15, a keyboard input device 10 may be provided to the control board of the personal computer.

A plurality of input keys 11 may be regularly arranged in the keyboard input device 10. As shown in FIG. 2, a plurality of key switches 12 may be arranged on the substrate 2, and each of the key switches 12 may be operated by each of the input keys 11.

As shown in FIG. 2, the input device 15 may include an input pad 20, and the input pad 20 may be supported so as to be movable. A sheet-shaped position detection sensor 24 which may function as an operation position detection unit may be stuck on the surface of the input pad 20. Therefore, the surface of the position detection sensor 24 is the operation surface 25. A configuration may be made such that the position detection sensor 24 is placed on the rear surface side of the input pad 20. As shown in FIG. 1, the input pad 20 may be placed on the front side which is closer to an operator than the keyboard input device 10. The operation surface 25 may have a rectangular shape. The operation surface 25 also may be in a circular shape or an elliptical shape.

As shown in FIG. 2, a mechanical pressing detection switch 22 which functions as a pressing detection unit may be installed on the substrate 2, and the actuator 22a thereof may face the lower surface of the input pad 20. Reinforcing springs S which may be formed of compression coil springs are provided between the substrate 2 and the input pad 20. Due to the pressing resistance force of the reinforcing springs S and the actuator of the pressing detection switch 22, appropriate resistance force may be exhibited when the input pad 20 is pressed.

As shown in FIG. 1, the operation surface 25 may be configured to include a front-side pressing operation area 25a and a back-side sliding operation area 25b. Although the pressing operation area 25a has a smaller area than that of the sliding operation area 25b, the sizes of the areas may not be particularly limited. In addition, the operation surface 25 may be divided into two areas on the front side and the back side, that is, the pressing operation area 25a and the sliding operation area 25b. However, it may be possible to arbitrarily determine the positions of the respective areas 25a and 25b provided on the operation surface 25. In FIG. 1, the boundary portion between the pressing operation area 25a and the sliding operation area 25b may be shown using a dotted line. This indicates that the respective areas 25a and 25b are not specified on the operation surface 25. However, the fact that the operation surface 25 may be divided into the pressing operation area 25a and the sliding operation area 25b may be displayed by drawing a line on the operation surface 25 for the operator's understanding.

If the pressing operation area 25a is pressed downward by a finger (operation body), the input pad 20 may rotationally move, and the pressing detection switch 22 may be converted from an OFF state to an ON state. Meanwhile, instead of the mechanical pressing detection switch 22, a deformation detection element, which detects the deformation of the input pad 20 when the operation surface 25 is pressed, may be used as the pressing detection unit.

The position detection sensor 24, which may be provided on the surface of the input pad 20 and may function as the operation position detection unit, may be, for example, a capacitive sensor. The position detection sensor 24 may have, for example, a flexible sheet shape, and may be fixed to the surface of the input pad 20 using means such as glue.

The position detection sensor 24 may be configured such that, for example, a plurality of X electrodes may be provided in parallel on one surface of an insulating resin film which may have a predetermined dielectric constant and that a plurality of Y electrodes which may be perpendicular to the X electrodes is provided in parallel on the other surface. For example, the cover layer of the resin film may be provided on the outermost surface of the position detection sensor 24.

If the finger touches the operation surface 25, it may be possible to acquire the operation position detection signal of the finger as XY coordinate information based on the change in capacity between the finger and the X electrodes and the change in capacity between the finger and the Y electrodes.

Figure 3:
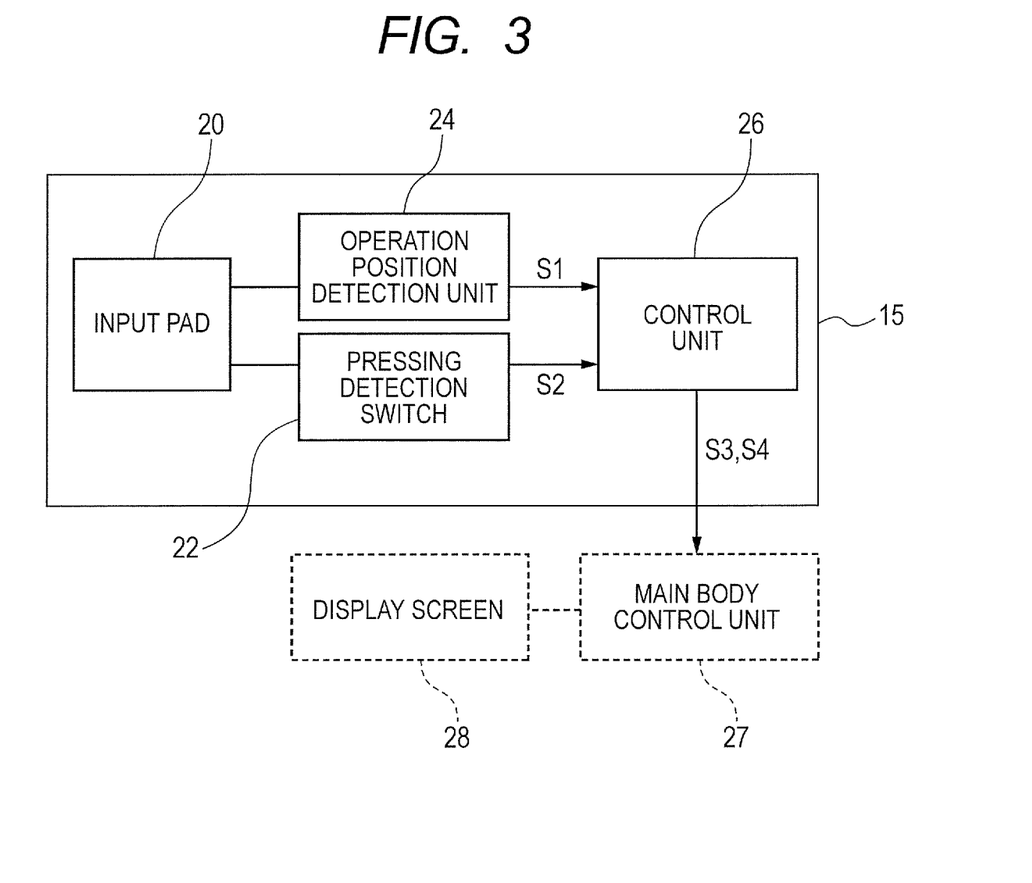
FIG. 3 is a block diagram illustrating the input device according to an embodiment of the present disclosure.

As shown in FIG. 3, the input device 15 may include the input pad 20, the position detection sensor 24 which may function as the operation position detection unit, the pressing detection switch 22 which may function as the pressing detection unit, and a control unit 26.

As shown in FIG. 3, the control unit 26 may be connected to both the position detection sensor 24 and the pressing detection switch 22.

The control unit 26 may receive an operation position detection signal S1 from the position detection sensor 24 and receives a pressing detection signal S2 from the pressing detection switch 22. When the pressing detection switch 22 comes into an ON state and the pressing detection signal S2 may be acquired, the control unit 26 may output a pressing operation input signal S3 to the main body control unit 27. The main body control unit 27 may be a control unit which is configured on the main body device side of a personal computer, and the main body control unit 27 may change the display of the display screen 28 corresponding to a pressing operation based on the pressing operation input signal S3.

The control unit 26 also may generate a sliding operation input signal S4 based on the operation position detection signal S1 of the position detection sensor 24 and transmit the sliding operation input signal S4 to the main body control unit 27. The main body control unit 27 may change the display of the display screen 28 corresponding to a sliding operation based on the sliding operation input signal S4.

Meanwhile, the sliding operation area 25b may be an area in which a sliding operation is frequently performed. However, even if a pressing operation is performed in the sliding operation area 25b, the pressing detection switch 22 may be turned on, and thus it may be possible to perform pressing detection.

Meanwhile, when the sliding operation is performed by a finger on the pressing operation area 25a, the control unit 26 may output the sliding operation input signal (sliding operation input signal) S4 to the main body control unit 27 based on the operation position detection signal S1 which is acquired from the position detection sensor 24.

That is, it is possible to perform the sliding operation and the pressing operation on the whole area of the operation surface 25.

However, in the embodiment, the input sensitivity of the sliding operation may be slightly insensitive in the pressing operation area 25a compared to the sliding operation area 25b, and an incorrect operation due to unintended sliding movement in the pressing operation area 25a may be suppressed. A method of controlling the input sensitivity of the pressing operation area 25a will be described with reference to a flowchart of FIG. 4.

Figure 4:
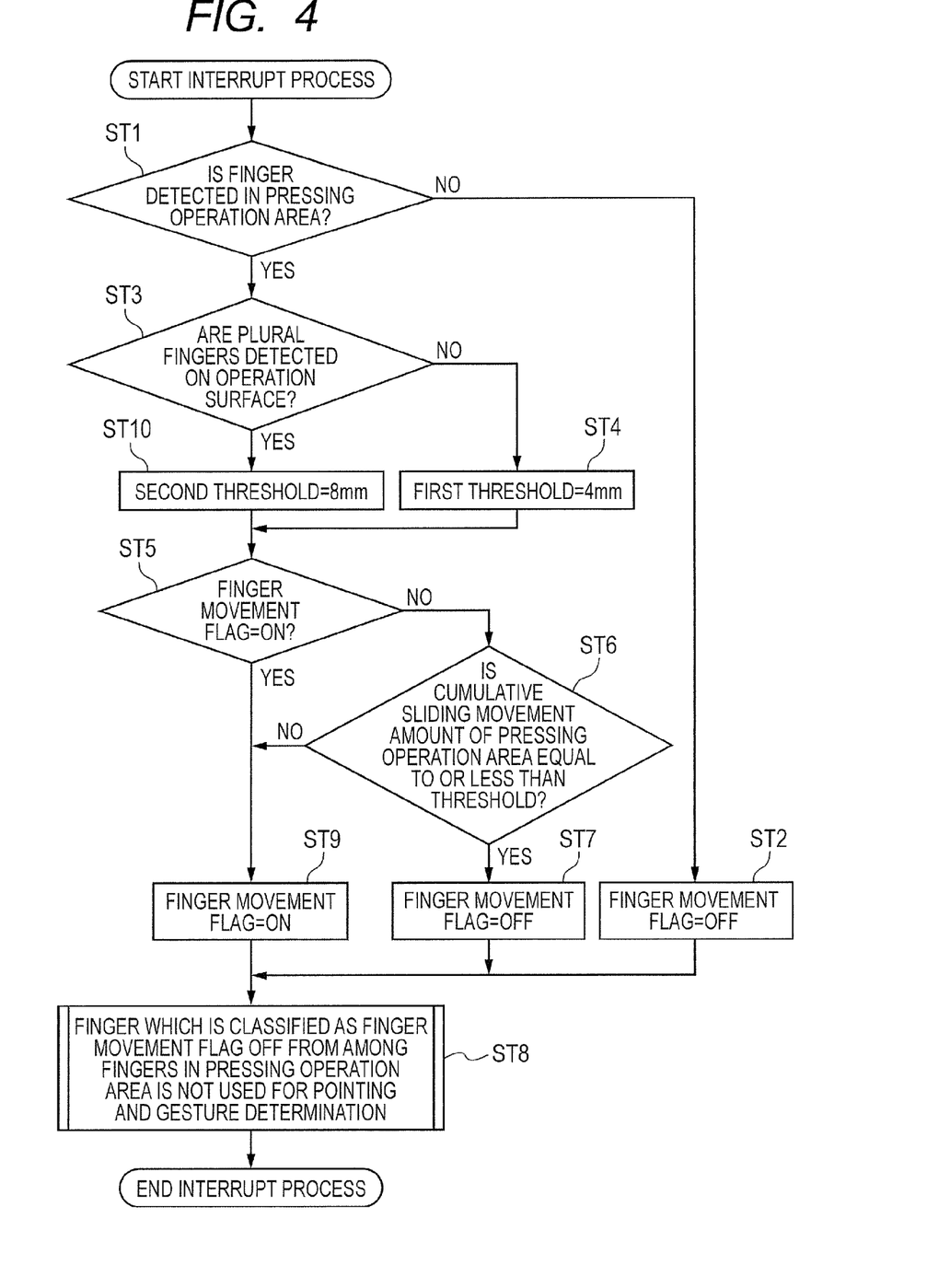
FIG. 4 is a flowchart illustrating a process operation for an operation which is performed in a pressing operation area.

First, in step ST1 of FIG. 4, the control unit 26 may determine whether or not a finger is detected in the pressing operation area 25a. The control unit 26 may determine whether or not a finger is present in the pressing operation area 25a based on the operation position detection signal S1 which may be acquired from the position detection sensor 24.

Figure 5:
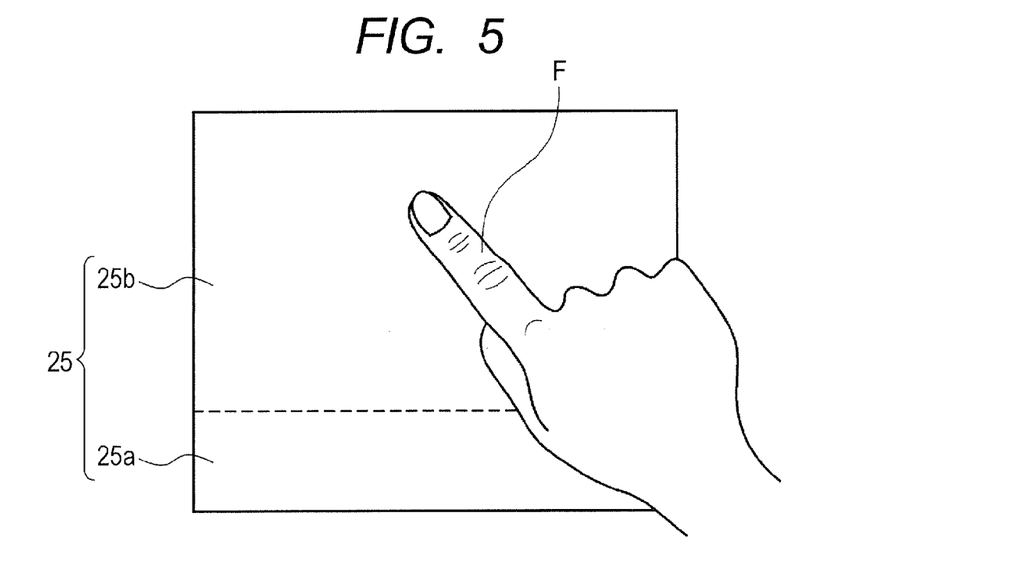
FIG. 5 is a plan view illustrating a state in which a finger (operation body) touches a sliding operation area.

For example, as shown in FIG. 5, when a finger F is present on the sliding operation area 25b of the operation surface 25, the process proceeds from step ST1 to step ST2. In step ST2, a finger movement flag may be set to "OFF". The finger movement flag is a flag which relates to a sliding operation in the pressing operation area 25a, and a state in which the finger movement flag is set to OFF indicates a state in which a finger that is caused to perform the sliding operation is not present in the pressing operation area 25a.

When the finger F which is shown in FIG. 5 is caused to perform the sliding operation on the operation surface 25, the sliding operation input signal S4 may be output from the control unit 26 to the main body control unit 27, and thus control may be performed such that, for example, a cursor in the display screen 28 performs the sliding movement based on the sliding operation input signal S4.

Here, the finger F which is shown in FIG. 5 is present in the sliding operation area 25b. However, when the finger F enters the pressing operation area 25a due to a sliding operation, the process proceeds from step ST1 to step ST3.

Figure 6:
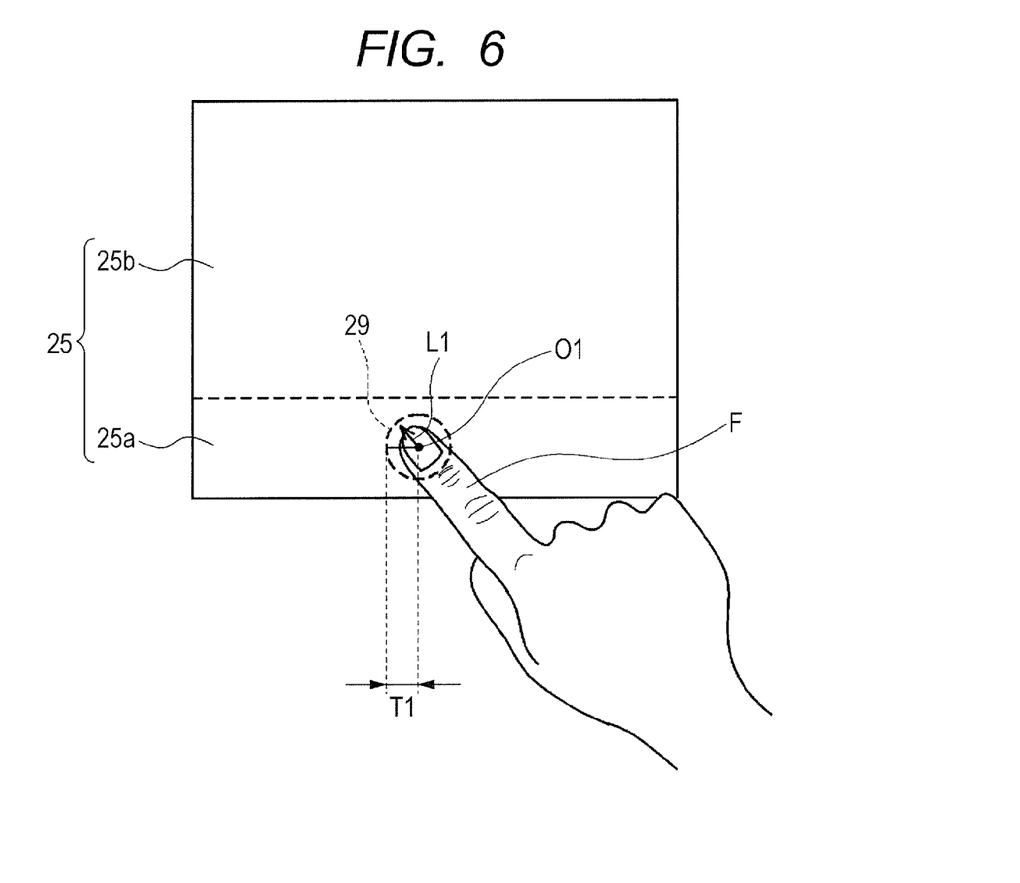
FIG. 6 is a plan view illustrating a state in which a single finger (operation body) touches a pressing operation area and, in particular, illustrating a first threshold according to an embodiment of the present disclosure.

In FIG. 6, the finger F may be positioned on the pressing operation area 25a. FIG. 6 shows, for example, a case in which a position where the finger F is initially placed is the pressing operation area 25a from a state in which the finger F is not present on the operation surface 25, and shows a state acquired when the finger F is caused to perform the sliding operation from the sliding operation area 25b to the pressing operation area 25a. In FIG. 6, since the finger F is present on the pressing operation area 25a, the process proceeds from step ST1 to step ST3 of FIG. 4.

In step ST3 of FIG. 4, it may be determined whether or not a plurality of fingers is detected on the operation surface 25. It is possible for the control unit 26 to detect the number of fingers which operate on the operation surface 25 based on the operation position detection signal S1 from the position detection sensor 24. In FIG. 6, since a single finger F operates on the operation surface 25, the process proceeds to step ST4. In step ST4, a first threshold is set to 4 mm. However, "4 mm" is only an example, and it is possible to arbitrarily determine the size of the threshold to be set. The first threshold is subject to a condition which is set when a single finger is detected on the operation surface 25 in step ST3.

Here, the "threshold" may be a reference length (reference distance) for comparison with the sliding movement amount (sliding movement amount) of the finger F which may be positioned in the pressing operation area 25a.

As shown in FIG. 6, a first threshold T1 may be set based on the reference point O1 of the finger F. The reference point O1 is, for example, the central position of the touching area of the finger F which touches the operation surface 25, and it may be possible to set the reference point O1 based on a change in the capacity of the position detection sensor 24. It is possible to arbitrarily determine a position in the touching area as the reference point O1.

As shown in FIG. 6, a virtual circle 29, which has a radius ranging from the reference point O1 to the first threshold T1, may be assumed.

As shown in FIG. 4, the process proceeds to step ST5 subsequent to step ST4. In step ST5, it may be determined whether or not the finger movement flag is set to ON. At this time point, the movement finger flag is not set to ON and is in an OFF state, and thus the process proceeds to step ST6.

In step ST6, it may be determined whether or not the sliding movement amount L1 (first sliding movement amount) of the finger F which is present in the pressing operation area 25a is equal to or less than the first threshold T1 as shown in FIG. 6.

When, for example, an operator performs a pressing operation on the pressing operation area 25a using the finger F in the state of FIG. 6 and the finger F unintentionally performs sliding movement on the operation surface 25, the control unit 26 may detect the sliding movement amount L1 of the finger F based on the operation position detection signal S1 of the position detection sensor 24. In addition, there may be a case in which the touching area of the finger F gradually becomes large due to the pressing operation, the operation position detection signal S1 of the position detection sensor 24 changes in accordance with the change in the touching area, and the control unit may 26 detect the sliding movement amount L1 of the finger F based on the changing operation position detection signal S1. However, since the finger F does not actually perform sliding movement, the latter may correspond to the misrecognition of detection.

When the sliding movement amount L1 of the finger F is equal to or less than the first threshold T1, that is, when the movement of the finger F is included in the virtual circle 29 of FIG. 6, the process proceeds from step ST6 to step ST7, and the finger movement flag is set to OFF.

Here, the state in which the finger movement flag is set to OFF indicates a state in which a finger which is caused to perform a sliding operation is not present in the pressing operation area 25a as described in advance.

That is, even when the finger F shown in FIG. 6 moves within the first threshold T1, the movement is not considered as an intended sliding operation. As described in step ST8 of FIG. 4, the finger F, the finger movement flag of which is in the OFF state, is not used for pointing or gesture determination. Therefore, even when the finger F moves in the first threshold T1, it is possible to prevent an incorrect operation, such as movement of a cursor in the display screen 28.

When the sliding movement amount L1 of the finger F is greater than the first threshold T1 in step ST6, the process proceeds to step ST9, and the finger movement flag is set to ON. Here, a state in which the finger movement flag is set to ON indicates a state in which a finger positioned in the pressing operation area 25a is intentionally caused to perform a sliding operation. Since the pressing operation area 25a is an area in which pressing operation can be performed and an area in which sliding operation can be performed in combination with the sliding operation area 25b, there is a case in which an operator performs sliding operation using the pressing operation area 25a.

Since the first threshold T1 is set in the pressing operation area 25a, the control unit 26 does not output the sliding operation input signal S4 to the main body control unit 27 if the sliding movement amount L1 of the finger F is not greater than the first threshold T1. However, if the sliding movement amount L1 of the finger F is greater than the first threshold T1, the finger movement flag may be set to ON, and thus the control unit 26 outputs the sliding operation input signal S4 to the main body control unit 27. Therefore, it is possible to perform an operation process of moving a cursor on the display screen 28 in combination with, for example, an operation performed in the pressing operation area 25a.

As described above, if the first threshold T1 is set in the pressing operation area 25a, input sensitivity for the sliding operation falls down compared to the sliding operation area 25b in which a threshold is not set or a threshold which is less than the threshold T1 is set. However, if the sliding movement amount L1 which is greater than the first threshold T1 is recognized in the pressing operation area 25a, it may be possible to perform an operation process (of moving a cursor in combination with the sliding movement) which is the same as the sliding operation in the sliding operation area 25b.

In FIG. 6, the virtual circle 29, which has the radius ranging from the reference point O1 to the first threshold T1, may be assumed. If the finger F performs sliding movement within the virtual circle 29, the finger movement flag is set to OFF in step ST7, and thus it may be possible to determine that a finger which is caused to perform a sliding operation is not present in the pressing operation area 25a. Otherwise, it may be possible to accumulate the sliding movement amount L1 of the finger F and to compare the accumulated value thereof with the first threshold T1 without assuming the virtual circle 29. That is, when the accumulated value is greater than the first threshold T1, the sliding operation input signal S4 may be transmitted to the main body control unit 27.

Figure 7:
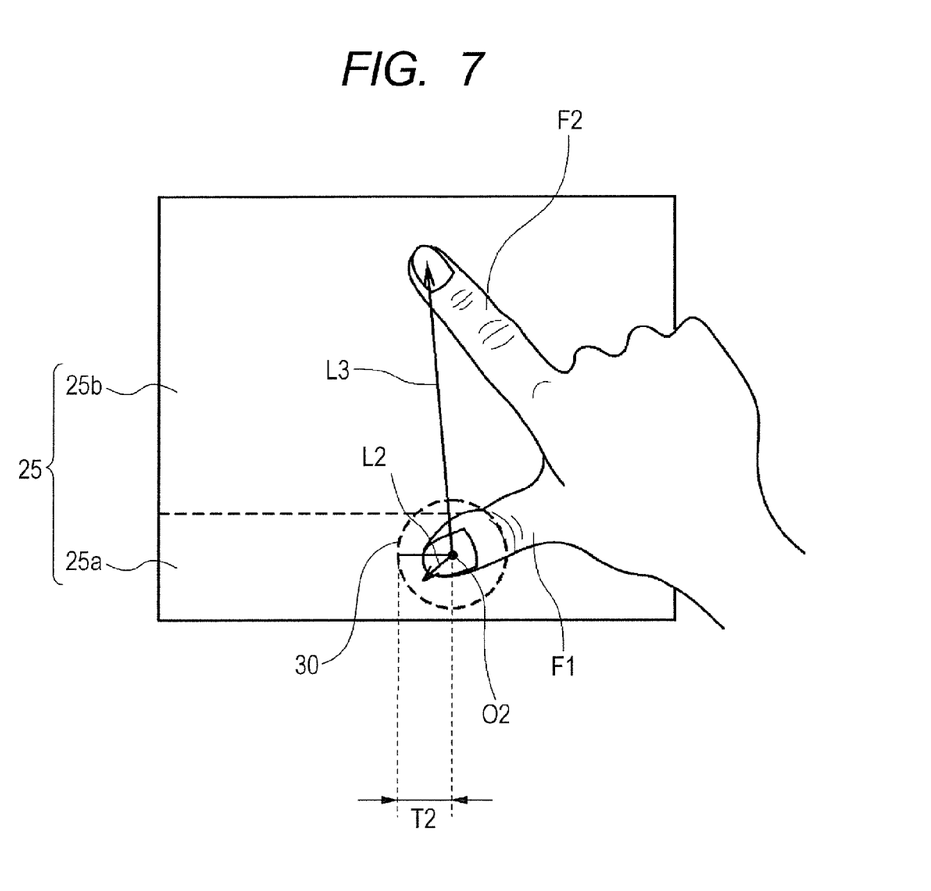
FIG. 7 is a plan view illustrating a state in which two fingers (operation bodies) touch an operation surface and, in particular, illustrating a second threshold for the sliding movement of a thumb which touches the pressing operation area.

Subsequently, a case in which a plurality of fingers F1 and F2 is detected on the operation surface 25 as shown in FIG. 7 will be described.

As shown in FIG. 7, it is assumed that two fingers F1 and F2 are detected on the operation surface 25 based on the operation position detection signal S1 of the position detection sensor 24. At this time, the first finger F1 (thumb) may be detected in the pressing operation area 25a and the second finger F2 (index finger) RMCCARTER@shb.com detected in the sliding operation area 25b.

In view of the flowchart of FIG. 4, the process proceeds from step ST1 to step ST3 depending on the result of detection performed by the position detection sensor 24. In step ST3, since the plurality of fingers F1 and F2 is detected on the operation surface 25, the process proceeds to step ST10.

In step ST10, a second threshold may be set to approximately 8 mm. However, "8 mm" is only an example, and it is possible to arbitrarily determine the size of the second threshold. The second threshold may be a parameter which is set when a plurality of fingers is detected in step ST3.

The second threshold may be set to a value which is greater than the first threshold. The reason for this is that it is easy for the unintended sliding movement amount L2 (second sliding movement amount) of the first finger F1 which is present on the pressing operation area 25a to be large when a plurality of fingers is present on the operation surface 25.

As shown in FIG. 7, a second threshold T2 may be set based on the reference point O2 of the first finger F1. It may be possible to set the reference point O2 to be the same as the reference point O1.

For example, a virtual circle 30 which has a radius ranging from the reference point O2 to the second threshold T2 is assumed as shown in FIG. 7.

Subsequently, as shown in FIG. 4, the process proceeds from step ST10 to step ST5. In step ST5, it may be determined whether or not the finger movement flag is set to ON. If the finger movement flag is not set to ON, the process proceeds to step ST6.

In step ST6, it may be determined whether or not the sliding movement amount L2 of the first finger F1 which is present in the pressing operation area 25a is equal to or less than the second threshold T2.

For example, it is assumed that an operator causes the second finger F2 to perform sliding movement on the operation surface 25 while the first finger F1 remains in the pressing operation area 25a in the state of FIG. 7. In such a gesture operation, when the first finger F1 which originally should not move performs sliding movement together with the movement of the second finger F2, the control unit 26 may detect the sliding movement amount (sliding movement amount) L2 of the first finger F1 based on the operation position detection signal S1 of the position detection sensor 24.

When the sliding movement amount L2 of the first finger F1 is equal to or less than the second threshold T2, that is, when the movement of the first finger F1 is included in the virtual circle 30 of FIG. 7, the process proceeds from step ST6 to step ST7, and the finger movement flag is set to OFF.

Here, a state in which the finger movement flag is set to OFF, indicates a state in which a finger which is caused to perform a sliding operation is not present in the pressing operation area 25a, as described in advance.

That is, even if the first finger F1 shown in FIG. 7 moves within the second threshold T2, the movement is not considered as an intended sliding operation. As in step ST8 of FIG. 4, the first finger F1, the finger movement flag of which is set to OFF, may not be used for pointing or gesture determination.

On the other hand, in step ST6, when the sliding movement amount L2 of the first finger F1 is greater than the second threshold T2, the process proceeds to step ST9, and the finger movement flag may be set to ON. Here, a state in which the finger movement flag is set to ON indicates a state in which the finger which is positioned in the pressing operation area 25a is caused to intentionally perform a sliding operation.

In FIG. 7, the virtual circle 30 which has the radius ranging from the reference point O2 to the second threshold T2 is assumed. If the first finger F1 performs sliding movement in the virtual circle 30, the finger movement flag may be set to OFF in step ST7, and thus it may be possible to determine that a finger which is caused to perform sliding movement is not present in the pressing operation area 25a. Otherwise, it may be possible to accumulate the sliding movement amount L2 of the first finger F1 and to compare the accumulated value thereof with the second threshold T2 without assuming the virtual circle 30.

Figure 8:
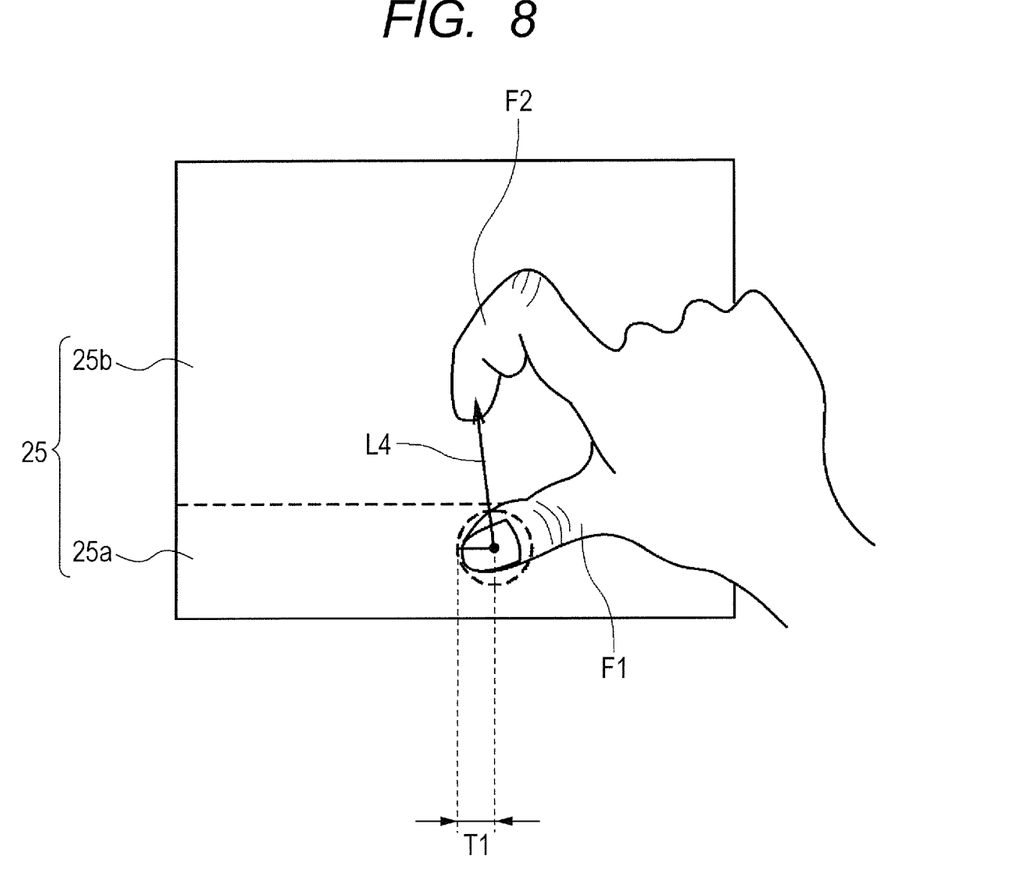
FIG. 8 is a plan view illustrating a state in which two fingers (operation bodies) touch the operation surface, and, in particular, illustrating a state in which a threshold which is different from the threshold of FIG. 7 is set.

In addition, as shown in FIG. 8, when a plurality of fingers F1 and F2 is detected on the operation surface 25, the first finger F1 of them may be detected in the pressing operation area 25a, and the second finger F2 may be detected in the sliding operation area 25b in a case in which a distance L4 between the plurality of fingers F1 and F2 of FIG. 8 is equal to or less than a predetermined value based on the operation position detection signal S1 of the position detection sensor 24, it is possible to set the size of the second threshold to be the same as that of the first threshold T1. That is, as shown in FIG. 7, when a distance L3 between the plurality of fingers F1 and F2 is greater than the predetermined value, control may be performed to set the second threshold T2 which is greater than the first threshold T1. The reason for this is that, when the distance L4 between the plurality of fingers F1 and F2 is not as far as shown in FIG. 8, it is easy for the sliding movement amount L2 of the first finger F1, which moves together with the sliding movement of the second finger F2, to be smaller than the case of FIG. 7 even if the second finger F2 is caused to perform sliding movement. Therefore, if the distance L4 between the plurality of fingers F1 and F2 is equal to or less than the predetermined value, it may be possible to set the size of the second threshold to be the same as that of the first threshold T1.

Figure 9:
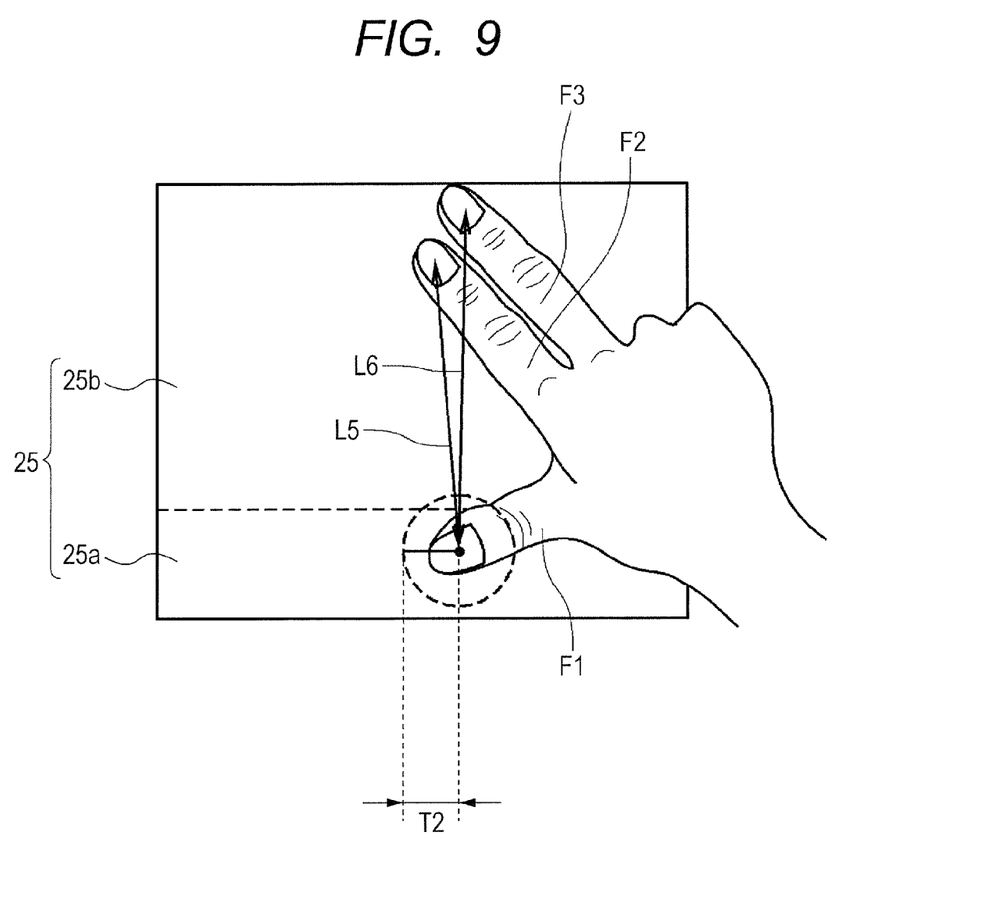
FIG. 9 is a plan view illustrating a state in which three fingers (operation bodies) touch the operation surface, and illustrating a state in which one finger of them is present on the pressing operation area and remaining two fingers are present on the sliding operation area.

In addition, although two fingers F1 and F2 touch the operation surface 25 in FIGS. 7 and 8, three or more fingers F1, F2, and F3 may touch the operation surface 25 as shown in FIG. 9.

As shown in FIG. 9, three fingers F1, F2, and F3 are present on the operation surface 25, the first finger F1 of them may be detected in the pressing operation area 25a, and two remaining fingers F2 and F3 are detected in the sliding operation area 25b. A distance between the respective fingers may be set to the second threshold T2 when the average distance of a distance L5 between the first finger F1 which is positioned in the pressing operation area 25a and the second finger F2 which is positioned in the sliding operation area 25b, and a distance L6 between the first finger F1 which is positioned in the pressing operation area 25a and the third finger F3 which is positioned in the sliding operation area 25b is equal to or greater than a predetermined value. When the average distance is less than the predetermined value, it may be possible to set a threshold which is the same as the first threshold T1. Otherwise, it may be possible to determine the size of the threshold by comparing the distance L6 between the first finger F1 and the third finger F3, which is positioned farthest from the finger F1 positioned in the pressing operation area 25a, with the predetermined value and without using the average distance.

Meanwhile, when the plurality of fingers is present on the operation surface 25 and at least one finger (first finger) of them is positioned in the pressing operation area 25a, control may be performed such that the second threshold T2 which is greater than the first threshold T1 is necessarily set.

In addition, it may be possible to vary the second threshold T2 depending on the distance between the plurality of fingers. That is, it is possible to set the threshold T2 such that the greater the distance between fingers the greater the second threshold T2.

Figure 10:
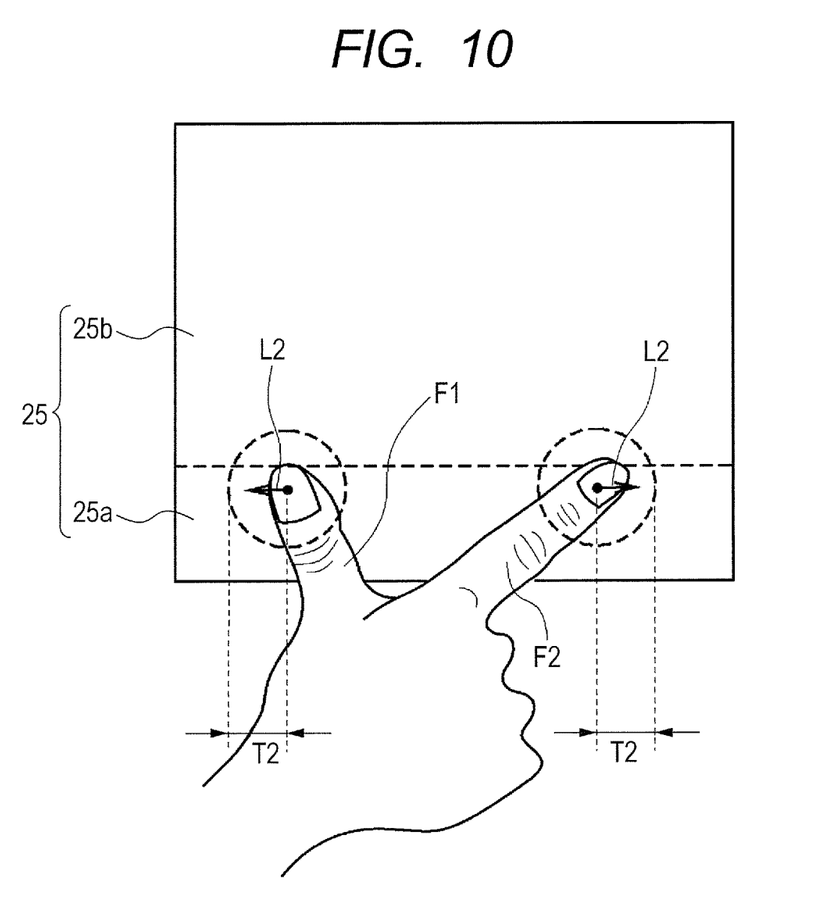
FIG. 10 is a plan view illustrating a state in which two fingers (operation bodies) touch the pressing operation area.

In FIGS. 7 to 9, the configuration is made such that a single first finger F1 of the plurality of fingers is detected in the pressing operation area 25a. However, even when the plurality of fingers F1 and F2 is detected in the pressing operation area 25a as shown in FIG. 10, the second threshold T2 may be set for each of the fingers F1 and F2. Further, it may be detected whether or not the sliding movement amount L2 of each of the fingers F1 and F2 is equal to or less than the second threshold T2 in step ST6. When the sliding movement amount L2 is equal to or less than the second threshold T2, the finger movement flag is set to OFF. When the sliding movement amount L2 is greater than the second threshold T2, the finger movement flag is set to ON.

In addition, the operation position detection unit which is installed in the input pad 20 is not limited to a capacitive sensor and may be a resistance detection-type sensor.

It should be understood by those skilled in the art that various modifications, combinations, sub-combinations and alterations may occur depending on design requirements and other factors insofar as they are within the scope of the appended claims of the equivalents thereof.

Accordingly, the embodiments of the present inventions are not to be limited in scope by the specific embodiments described herein. Further, although some of the embodiments of the present disclosure have been described herein in the context of a particular implementation in a particular environment for a particular purpose, those of ordinary skill in the art should recognize that its usefulness is not limited thereto and that the embodiments of the present inventions can be beneficially implemented in any number of environments for any number of purposes. Accordingly, the claims set forth below should be construed in view of the full breadth and spirit of the embodiments of the present inventions as disclosed herein. While the foregoing description includes many details and specificities, it is to be understood that these have been included for purposes of explanation only, and are not to be interpreted as limitations of the invention. Many modifications to the embodiments described above can be made without departing from the spirit and scope of the invention.

What is claimed is:

1. An input device comprising:
an operation surface;
an operation position detection unit that detects an operation position of an operation body on the operation surface;
a pressing detection unit that detects pressing of the operation surface; and
a control unit that receives an operation position detection signal from the operation position detection unit and a pressing detection signal from the pressing detection unit, respectively,
wherein the operation surface includes a pressing operation area provided on a front side of a sliding operation area,
wherein, when there is a single operation body which operates on the operation surface and the operation body is detected in the pressing operation area by the operation position detection unit, the control unit does not output a sliding operation input signal based on a first sliding movement amount if the first sliding movement amount based on the operation position detection signal of the operation body is equal to or less than a first threshold, and outputs the sliding operation input signal based on the first sliding movement amount if the first sliding movement amount is greater than the first threshold,
wherein, when there is a plurality of operation bodies which operates on the operation surface and at least one of the operation bodies is detected in the pressing operation area by the operation position detection unit, the control unit determines that the operation of the at least one of the operation bodies in the pressing operation area is as an unintended sliding movement and does not output a sliding operation input signal based on a second sliding movement amount if the second sliding movement amount, based on the operation position detection signal of the operation body which is detected in the pressing operation area, is equal to or less than a second threshold, and outputs the sliding operation input signal based on the second sliding movement amount if the second sliding movement amount is greater than the second threshold, and
wherein the second threshold is greater than the first threshold.

2. The input device according to claim 1,
wherein, when there is the plurality of operation bodies which operates the operation surface and a distance between a first operation body which is detected in the pressing operation area and an operation body other than the first operation body is greater than a predetermined value, the control unit determines that the first operation body unintentionally moved with the operation body other than the first operation body and the second threshold is set such that the second threshold is greater than the first threshold.

* * * * *